United States Patent [19]

Berzen

[11] Patent Number: 5,262,463
[45] Date of Patent: Nov. 16, 1993

[54] NEUTRON-ABSORBING MATERIALS

[75] Inventor: Josef Berzen, Oberhausen, Fed. Rep. of Germany

[73] Assignee: Hoechst Aktiengesellschaft, Fed. Rep. of Germany

[21] Appl. No.: 4,219

[22] Filed: Jan. 11, 1993

Related U.S. Application Data

[63] Continuation of Ser. No. 581,511, Sep. 12, 1990, abandoned.

[30] Foreign Application Priority Data

Sep. 15, 1989 [DE] Fed. Rep. of Germany ....... 3930887

[51] Int. Cl.$^5$ .................... C08K 3/38; G21C 11/08
[52] U.S. Cl. .................... 524/404; 524/405; 250/518.1
[58] Field of Search ............... 524/183, 184, 185, 330, 524/404, 405; 250/518.1

[56] References Cited

U.S. PATENT DOCUMENTS

| | | | |
|---|---|---|---|
| 3,644,217 | 2/1972 | Cyba | 524/89 |
| 3,929,939 | 12/1975 | Salyer et al. | 524/587 |
| 3,979,357 | 9/1976 | Salyer et al. | 524/80 |
| 4,115,499 | 9/1978 | Salyer et al. | 525/240 |
| 4,123,392 | 10/1978 | Hall et al. | 252/478 |
| 4,522,868 | 6/1985 | Ohuchi et al. | 428/224 |

FOREIGN PATENT DOCUMENTS 60-194394 10/1985 Japan .

*Primary Examiner*—Paul R. Michl
*Assistant Examiner*—Peter Szekely
*Attorney, Agent, or Firm*—Jordan B. Bierman

[57] ABSTRACT

A boron-containing polyethylene having an average molecular mass of at least $2.5 \times 10^6$ g/mol as a neutron-absorbing material.

24 Claims, No Drawings

NEUTRON-ABSORBING MATERIALS

This application is a continuation of application Ser. No. 07/581511, filed Sep. 12, 1990, now abandoned.

The invention relates to a neutron-absorbing material. It is composed of ultrahigh molecular weight polyethylene in which a boron compound, preferably boron carbide $B_4C$, is embedded.

BACKGROUND OF THE INVENTION

In contrast to alpha- and beta-particles, neutrons do not have a charge and therefore cannot lose energy by ionization on passing through matter. Consequently, their penetration power is extremely high. Neutrons are influenced exclusively by the action of nuclear forces and are scattered at atomic nuclei. According to the collision laws, the energy released to the body receiving the impact is greater the more similar the mass thereof is to the mass of the colliding body. Therefore, a bundle of neutron beams, which penetrates lead plates of several meters thickness without significant attenuation, is very greatly attenuated when passing through hydrogen-containing substances of a few cm thickness. On average, the energy is reduced to 1/e on collision with a proton, whereas the energy release to atomic nuclei of higher mass is less, due to inelastic collision. It is known from the literature that, on average, 18 collisions are necessary in hydrogen and 114 collisions are necessary in carbon in order to brake a neutron down to thermal energy. These thermal, i.e. slow, neutrons can then be completely absorbed by elements of high effective cross-section, such as cadmium or boron.

In neutron absorption, binding energy is released in the form of secondary gamma-radiation. Its nature depends on the absorbant and can be of considerable magnitude. Thus, the gamma-radiation energy is 6 MeV in the absorption of neutrons by cadmium, 2.2 MeV by hydrogen, and only 0.5 MeV by boron. As the materials which protect against neutron radiation, especially water and paraffins as well as plastics containing significant quantities of hydrogne, such as polyethylene, polyesters and polyamides, are used.

Thus, according to the teaching of German Auslegeschrift 1,297,869, moldings of thermoplastic or thermosetting plastics, in which the carbon/hydrogen ratio or the residual atom/hydrogen ratio is in the range of 1:2.1 to 2:1 and the molecular weight of which is less than 200,000, are used for protection against gamma-radiation and neutron radiation. Such plastics can be from the classes of high- and low-pressure polyethylenes, polypropylenes, alkylene/propylene or alkylene/butylene copolymers, polyamides, and polyesters.

In German Auslegeschrift 11 62 694, a neutron-absorbing material is described in which granulated polyethylene is embedded in a hydrogen-containing liquid which remains liquid or cures to give a plastic. However, the known neutron-absorbing materials have properties which restrict their applicability. Thus, although plastics have a low density, their processibility frequently causes difficulties. Moreover, their mechanical behavior does not always meet all requirements and their heat resistances are frequently unsatisfactory.

BRIEF DESCRIPTION OF THE INVENTION

It is an object of the present invention to provide a neutron-absorbing material which can be processed by conventional methods, is mechanically strong, resists thermal influences, and has a low density. This object is achieved by a neutron-absorbing material in which boron is embedded in polyethylene. It is defined by an average molecular mass, measured by viscosimetry, of the predominantly linear polyethylene, of at least $2.5 \times 10^6$ g/mol.

DETAILED DESCRIPTION OF THE INVENTION

Linear polyethylenes having an average molecular mass of from $2.5 \times 10^6$ g/mol to $1 \times 10^7$ g/mol are also described as ultrahigh molecular-weight polyethylenes (PE-UHMW). The molecular mass quantified above is understood to mean the values determined by viscosimetry. A method for measuring them is described, for example, in CZ-Chemietechnik 4 (1974), 129 et seq.

The preparation of PE-UHMW is known. It can be carried out by various processes. A proven process, which is operated under low pressure with mixed catalysts of titanium (III) halides and aluminum-organic compounds, is described in German Auslegeschrift 23 61 508. Ultrahigh molecular-weight polyethylene is distinguished by a number of advantageous physical properties. Its high wear resistance, its low coefficient of friction against other materials, its excellent toughness, and its remarkable resistance to numerous chemicals should be singled out.

PE-UHMW having molecular masses of between $2.5 \times 10^6$ g/mol and $8 \times 10^6$ g/mol, especially $3 \times 10^6$ g/mol and $6 \times 10^6$ g/mol, has proven particularly suitable for the neutron-absorbing material according to the invention. In order to ensure that no long-lived radioactive isotopes are formed by the nuclear process taking place on neutron capture, the polyethylene must be substantially free of impurities. In particular, the compounds still present from the preparation, which were used as catalysts or constituents of catalysts, must not exceed a content of 200 ppm by weight, preferably 150 ppm by weight, based on the polymer.

Furthermore, it is advisable to protect the PE-UHMW from effects of heat, light and oxidation. Examples of compounds, alone or in combination, which have proven suitable as stabilizers are as follows: 4,4'-thiobis-(3-methyl-6-tertiary-butyl-1-phenol), dilauryl thiodipropionate, distearyl thiodipropionate, tetrakis [methylene-(3,5-ditertiary-butyl-4-hydroxy-hydrocinnamato)]-methane, n-octadecyl-$\beta$-(4'-hydroxy-3,5'-ditertiary-butylphenyl)-propionate and glycol bis-[3,3-bis-(hydroxy-3'-tertiary-butylphenyl)-butanoate]. They are generally added in quantities of from 0.1 to 0.2% by weight, based on the total mixture. The addition of antioxidants is important because polyethylene is oxidized in the presence of oxygen under the action of gamma-radiation. It is then transformed into low molecular weight waxy products, is embrittled, and loses its elasticity.

As a further constituent, the novel material contains boron in the form of boron compounds such as boric acid ($H_3BO_3$). Boron carbide $B_4C$ has proven particularly suitable; boron nitride is less suitable because of its thermal properties. Mixtures of different boron compounds can also be used, but the material should preferably be chemically homogeneous. Boron carbide is used in commercially available purity. In using the novel neutron-absorbing material in practice, it is important that it be homogeneous. It is therefore advisable to incorporate boron carbide, as finely dispersed as possible, into the polyethylene; i.e. boron carbide is desirably of a particle size which corresponds to the size of the polyethylene particles. It has proven advantageous to use boron carbide of a particle size of from 10 to 200 μm and especially from 20 to 80 μm. This prevents segregation of the components during the processing of the material and no irregularities arise in its structure. Surprisingly, the outstanding mechanical properties of PE-UHMW are impaired very little by the addition of boron carbide, and certain physical features, e.g. the attrition behavior, are even improved.

The boron carbide content in the novel material depends on the layer thickness in which it is used. It has been found that, in the case of thin layers, i.e. up to 5 mm, the screening properties are markedly improved with increasing B$_4$C content. At layer thicknesses above about 20 mm, an increase in the B$_4$C concentration in the material to more than 1%, relative to the material, has little further effect on the absorption behavior. At a given degree of attenuation, the required layer thickness for absorption of thermal neutrons can therefore be determined via the B$_4$C content.

Allowing for the desired material properties, the preparation and the processibility of the novel material, it is advisable to adjust the B$_4$C concentration to values of from 5 to 50% by weight, preferably from 10 to 40% by weight, and especially from 20 to 30% by weight, each based on the polyethylene containing boron carbide.

The neutron-absorbing material of the invention is prepared by homogeneously mixing the starting materials PE-UHMW, boron compound and, if desired, additives in a suitable mixer and subsequently sintering the mixture under pressure at temperatures of from 180° to 250° C., especially from 200° to 230° C. The sintering pressure is from 5 to 10 MPa, especially from 8 to 10 MPa. Cooling is also carried out under pressure, and 3 to 5 MPa, preferably 4 to 5 MPa, has proven suitable. The sintering and cooling times depend on the thickness of the material and on the filler content. Thus, the sintering time is, for example, 5 hours for plates of 60 mm thickness, which are composed of 70% by weight of polyethylene and 30% by weight of B$_4$C.

The novel material can be mechanically worked in the conventional manner; for example, drilled, milled, and sawn, and allowance must, of course, be made here for the properties of the boron carbide, in particular its hardness; it can also be formed by pressing.

The invention is explained in more detail in the following example.

EXAMPLE

For the irradiation tests, laboratory plates of PE-UHMW (diameter 140 mm), having a molecular mass of about 3×10$^6$ g/mol (Hostalen GUR 412 ®) with 1, 5, 10, 20, and 30% by weight of boron carbide were prepared in thicknesses of 1, 5, 20, and 60 mm under standard conditions (pressure on sintering 5 MPa, pressure on cooling 10 MPa, sintering and/or cooling time depending on the thickness of material and on the filler content). Unfilled PE-UHMW of the same molecular mass and in the same dimensions was used as a comparison.

The boron carbide used was the commerical product TETRABOR F 280 from Elektroschmelzwerk Kempten GmbH, having a particle size of 22–59 μm. For preparing the laboratory plates, the particular components were homogeneously mixed in a laboratory mixer. The samples were irradiated with thermal neutrons of an energy less than 1 eV.

The neutron absorption coefficients were calculated by the following equation:

$$I = I_O \cdot e^{-\Sigma_{tot} \cdot X}$$

where:

X thickness of the sample $\Sigma_{tot}$ total absorption coefficient which contains all the absorption components and scattering components in PE and boron.

$I_o$ counting rate of the neutron beam, measured before the use of every sample thickness, in order to eliminate changes in the reactor power.

I attenuated counting rate at layer thickness X of the sample.

The measured results show that, at low layer thicknesses, the screening of thermal neutrons by the novel material increases with increasing B$_4$C content. At large layer thicknesses, B$_4$C concentrations above about 1% by weight (relative to the PE-UHMW filled with B$_4$C) do not lead to any improvement in the absorption behavior. Thus, the attenuation is then independent of the boron carbide concentration.

| | Material thickness (mm) | Zero counting rate I$_o$ (particles/second) | Counting rate I with sample (particles/sec.) | $\Sigma_{tot}$ (mm$^{-1}$) |
|---|---|---|---|---|
| Hostalen GUR | 1.08 | 5270 | 4172 | 0.2164 |
| | 5.25 | 5302 | 1881 | 0.1974 |
| | 20.1 | 5269 | 264.3 | 0.1489 |
| | 60.2 | 5243 | 11.303 | 0.1020 |
| +1% B$_4$C | 1.11 | 5263 | 4100 | 0.2250 |
| | 5.24 | 5244 | 1490 | 0.2401 |
| | 20.3 | 5309 | 73.15 | 0.2111 |
| | 60.2 | 5249 | 1.155 | 0.1399 |
| +5% B$_4$C | 1.06 | 5252 | 3654 | 0.3424 |
| | 4.76 | 5237 | 792.7 | 0.3967 |
| | 19.8 | 5229 | 5.497 | 0.3464 |
| | 58.8 | 5284 | 1.021 | 0.1454 |
| +10% B$_4$C | 1.16 | 5248 | 3029 | 0.4736 |
| | 4.95 | 5276 | 357.1 | 0.5440 |
| | 19.7 | 5236 | 1.573 | 0.4117 |
| | 60.1 | 5298 | 0.919 | 0.1441 |
| +20% B$_4$C | 1.00 | 5270 | 2484 | 0.7522 |
| | 5.02 | 5257 | 83.44 | 0.8253 |
| | 21.2 | 5225 | 0.986 | 0.4045 |
| | 60.3 | 5247 | 0.862 | 0.1445 |
| +30% B$_4$C | 1.03 | 5297 | 1904 | 0.9934 |
| | 5.07 | 5202 | 28.87 | 1.0245 |
| | 20.7 | 5231 | 0.966 | 0.4153 |
| | 60.9 | 5298 | 0.856 | 0.1434 |

A comparison of the measured value shows that the absorption coefficients at small thicknesses are considerably higher than those at thicknesses of >20 mm. This behavior can be explained by the fact that the thermal neutrons are almost completely absorbed in thinner layers and a small proportion of fast neutrons contained in the bundle of neutron beams is braked in thicker layers of material to lower speeds and then absorbed. A substantially small absorption coefficient must be expected for these thermallized, orginally fast neutrons.

In the table which follows, the particular material thickness, at which 95% of the thermal neutrons are absorbed, is indicated in accordance with the equation for calculating the absorption coefficients. This calculation was based on the averages of the absorption coefficients for thin material thickness (≦5 mm) from the absorption measurements for each B₄C content.

| | Layer thickness (mm) at 95% absorption | $\Sigma_{tot}$ (mm$^{-1}$) |
|---|---|---|
| PE-UHMW (Molecular mass: about 4 × 10⁶ mol/g) | 13.6 | 0.22 |
| +1% B₄C | 12.0 | 0.25 |
| +5% B₄C | 7.7 | 0.39 |
| +10% B₄C | 5.7 | 0.53 |
| +20% B₄C | 3.8 | 0.80 |
| +30% B₄C | 3.0 | 1.02 |

It will be clearly seen that the layer thickness is considerably reduced with increasing B₄C content.

I claim:

1. A neutron-absorbing material consisting of polyethylene having boron and/or a boron compound embedded therein, said polyethylene having an average molecular mass, measured by viscosimetry, of at least $2.5 \times 10^6$ g/mol.

2. The material of claim 1 wherein said polyethylene is predominantly linear.

3. The material of claim 1 wherein said molecular mass is $2.5 \times 10^6$ to $8.0 \times 10^6$ g/mol.

4. The material of claim 1 wherein said molecular mass is $3 \times 10^6$ to $6 \times 10^6$ g/mol.

5. The material of claim 1 wherein there is a boron compound present selected from the group consisting of H₃BO₃ and B₄C.

6. The material of claim 5 wherein said compound is B₄C.

7. The material of claim 6 wherein said B₄C has a particle size of 10 to 200 μm.

8. The material of claim 7 wherein said particle size is 20 to 80 μm.

9. The material of claim 6 wherein said B₄C is present in a concentration of 5 to 50% by weight, based on said material.

10. The material of claim 9 wherein said concentration is 10 to 40%.

11. The material of claim 9 wherein said concentration is 20 to 30%.

12. The material of claim 1 wherein at least one stabilizer against heat, light, and/or oxidation is present.

13. The material of claim 4 wherein said polyethylene is linear, said compound is B₄C having a particle size of 20 to 80 μm, and is present in a concentration of 20 to 30% by weight based on said material, and a stabilzer against heat, light, and/or oxidation is present in a stabilizer amount of 0.1 to 0.2% by weight based on said material.

14. The material of claim 13 wherein said stabilizer is selected from the group consisting of 4,4'-thiobis-(3-methyl-6-t-butyl-1-phenol), dilauryl thiodipropionate, distearyl thiodipropionate, tetrakis[methylene-(3,5-di-t-butyl-4-hydroxy-hydro-cinnamato)]-methane, n-octadecyl-β-(4'-hydroxy-3,5'-di-t-butylphenyl)-propionate, and glycol bis-[3,3-bis-(hydroxy-3'-t-butylphenyl)-butanoate.

15. The material of claim 1 wherein impurities in said polyethylene do not exceed a content of 200 ppm by weight based on said polyethylene.

16. The material of claim 15 wherein said content does not exceed 150 ppm.

17. A process for the production of the material of claim 1 comprising mixing said polyethylene and said boron and/or boron compound to form a mixture, sintering said mixture, and cooling said mixture.

18. The process of claim 17 wherein said sintering is at a sintering temperature of 180° to 250° C.

19. The process of claim 18 wherein said sintering temperature is 200° to 230° C.

20. The process of claim 17 wherein said sintering is at a sintering pressure of 5 to 10 MPa.

21. The process of claim 20 wherein said sintering pressure is 8 to 10 MPa.

22. The process of claim 17 wherein said cooling is at a cooling pressure of 3 to 5 MPa.

23. The process of claim 22 wherein said cooling pressure is 4 to 5 MPa.

24. The method of claim 19 wherein said sintering is at a sintering pressure of 8 to 10 MPa, said cooling is at a pressure of 4 to 5 MPa.

* * * * *